United States Patent [19]

Andersen

[11] Patent Number: 4,968,242

[45] Date of Patent: Nov. 6, 1990

[54] APPARATUS FOR TANDEM MOLDING OF PLASTIC CONTAINERS

[75] Inventor: Jorn W. Andersen, Newburgh, Ind.

[73] Assignee: Ball Corporation, Muncie, Ind.

[21] Appl. No.: 379,606

[22] Filed: Jul. 13, 1989

Related U.S. Application Data

[62] Division of Ser. No. 106,306, Oct. 9, 1987, abandoned.

[51] Int. Cl.⁵ .................................................. B29C 49/18
[52] U.S. Cl. ....................................... 425/531; 425/536
[58] Field of Search ............... 425/527, 528, 530, 531, 425/535, 536; 264/514, 515, 527, 529, 530, 536, 540, 543

[56] References Cited

U.S. PATENT DOCUMENTS

| | | | |
|---|---|---|---|
| 2,579,399 | 12/1951 | Ruekberg | 425/536 |
| 3,317,955 | 5/1967 | Schurman et al. | 264/527 |
| 3,394,209 | 7/1968 | Cheney | 264/527 |
| 3,456,290 | 7/1969 | Ruekberg | 264/159 X |
| 3,525,123 | 8/1970 | Cines et al. | 264/527 X |
| 3,764,250 | 10/1973 | Waterloo | 264/543 X |
| 3,804,573 | 4/1974 | Del Piero | 425/536 X |
| 3,969,059 | 7/1976 | Michel | 264/543 X |
| 3,986,807 | 10/1976 | Takegami et al. | 264/543 X |
| 4,036,925 | 7/1977 | Kauffman et al. | 264/543 X |
| 4,213,750 | 7/1980 | Kubota et al. | 264/543 X |
| 4,332,750 | 6/1982 | Roggenburg, Jr. et al. | 264/529 X |
| 4,650,628 | 3/1987 | Evely | 264/531 |

Primary Examiner—Richard L. Chiesa
Attorney, Agent, or Firm—Gilbert E. Alberding

[57] ABSTRACT

Apparatus is provided for expanding an earlier-extruded portion (42) of extruded plastic tubing (38) or plastic parison (41) into a first container (96a), for expanding a later-extruded portion (43) of the extruded plastic tubing (38) or parison (41) into a second container (96b), for delaying expanding the second portion (43) with respect to expanding the first portion (42) into the first container (96a), and for subsequently separating the second container (96b) from the first container (96a).

5 Claims, 3 Drawing Sheets

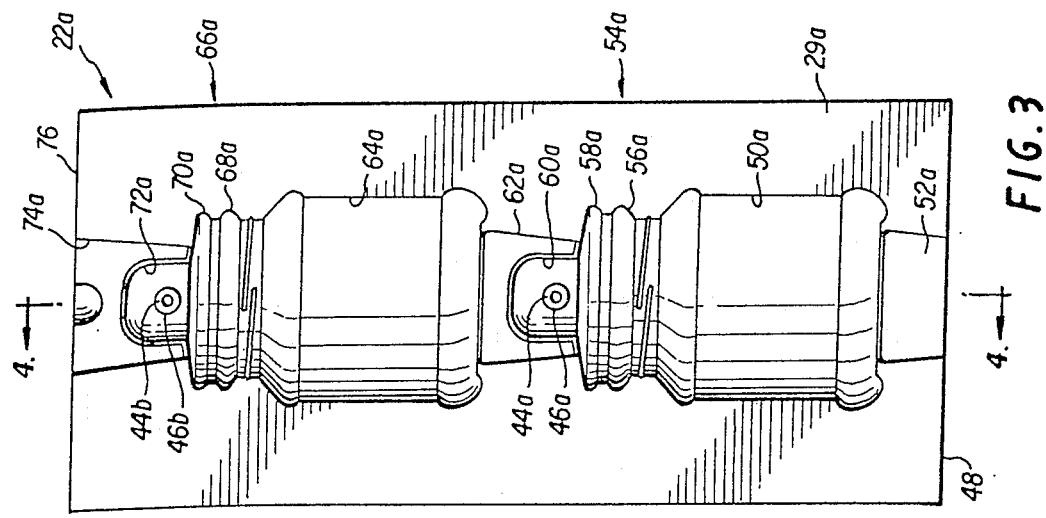
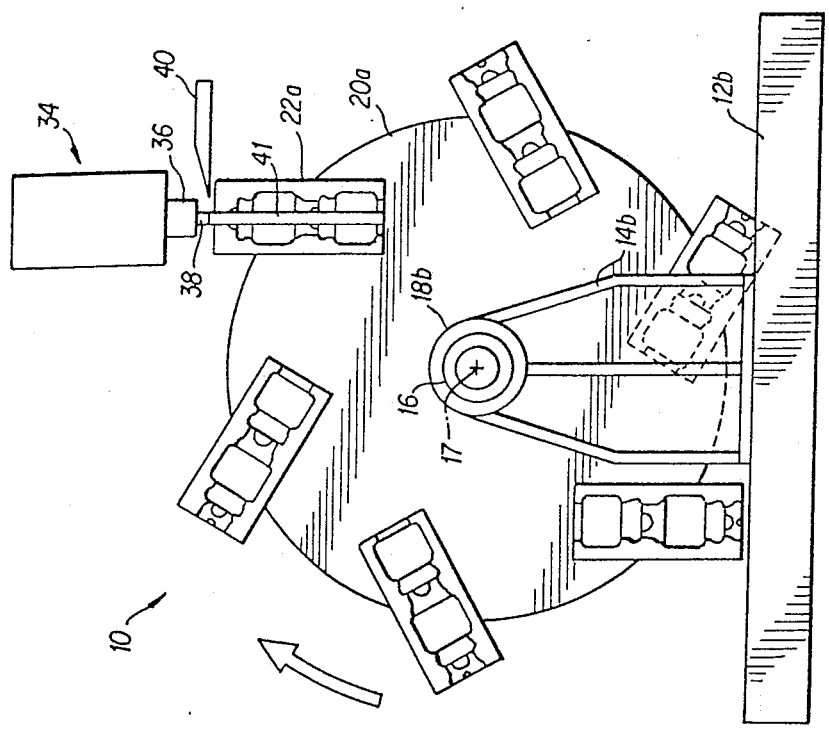

APPARATUS FOR TANDEM MOLDING OF PLASTIC CONTAINERS

This application is a division of application Ser. No. 106,306, filed Oct. 9, 1987, now abandoned.

BACKGROUND OF THE INVENTION

1. Field of the Invention

The present invention relates generally to molding plastic containers from extruded plastic parisons. More particularly, the present invention relates to tandem molding two containers in a mold.

2. Description of the Prior Art

Plastic containers for use in the food processing industry are commonly blow molded from a parison that is cut from extruded plastic tubing. The plastic tubing may include an inner circumferential layer that does not impart any taste to food when left in contact therewith, an outer circumferential layer that has low permeability and so preserves freshness by excluding air, and a filler layer that is disposed between the inner and outer circumferential layers. A lower cost material is used for the filler layer; and the filler layer includes scrap from the molding process.

Commonly the process of molding plastic containers comprises continuously extruding plastic tubing from an extrusion mold, cutting a parison from the extruded plastic tubing, placing the parison between two halves of a blow mold, injecting a blow needle through a moil portion of the parison, blowing the parison into a container that includes an integral moil, removing the container and moil from the blow mold, and removing the moil from the container.

In order to increase the production rate of blow molding, several blow molds may be used with a single extrusion machine. The blow molds are transported in a predetermined pattern and sequentially receive a parison that is cut from the tubing that is being extruded. In one common arrangement, the blow molds are circumferentially spaced on a vertically-disposed disk and each receive a parison as they arrive at a particular circumferential location.

Commonly, each blow mold forms a single container. However, the prior art also teaches using molds that include cavities for two containers.

For instance, Ruekberg, in U.S. Pat. No. 3,456,290, teaches "logged" blow molding. In "logged" blow molding, two containers are blown mouth-to-mouth; and the blow needle is inserted into a moil that is interposed between the mouths of the two containers.

"Logged" blow molding allows the use of higher extrusion rates and substantially doubles the production for a machine having a given number of blow molds. However, since the parison that is used for "logged" blow molding is approximately twice as long as a parison for molding containers singly the curvature in the parison has resulted in uneven wall thicknesses in the blown containers.

Evely, In U.S. Pat. No. 4,650,628 of common assignee with the present invention, teaches "logged" blow molding in which means is provided for straightening the parison thereby minimizing the problem of uneven wall thicknesses in containers that are "logged."

Even with the advance of Evely, blowing two containers at a lime has not been without some difficulties, and these difficulties have been attributable to temperature differentials in the parison. Since blowing two containers from a single parison substantially doubles the length of the parison, then by reason of its relatively long length, and by reason of the relatively short time between leaving the extrusion and the time that blow molding occurs there are large temperature variations in the parison. That is, as is commonly known, any body separated from a warmer body and exposed to air will air cool toward the temperature of the air as a function of time. Therefore, the earlier-extruded portion has had time to air cool to a lower temperature; whereas the later-extruded portion is more nearly at the temperature at which it left the extruder.

The temperature variations in the parison have caused blemishes in the blown containers that are cosmetically objectionable to the food processing industry.

More particularly the blemishes have appeared in one of the two containers that are "logged." Typically, the blemishes have caused a variation in the translucency of the plastic container and have looked much like a run in a painted surface. Also, the imperfections have caused a variation in the exterior surface that feels like a wrinkle that has almost been ironed out but not completely.

It has been hypothesized that the imperfections in "logged" containers are caused by temperature variations in the parisons; and the problem has been solved by providing a delay between blowing the later-extruded portion of the parison and blowing the earlier-extruded portion of the parison thereby allowing the later-extruded portion to air cool prior to blowing a container therefrom.

While this delay in blowing the later-extruded portion is effective to eliminate the afore-mentioned blemishes in the containers the reasons for the improvement are not completely understood.

It may be that elimination of the cosmetic defects is attributable to: a reduction in the temperature of the second portion of the parison, a resultant increase in the viscosity of the material, a reduction in the tendency of the higher viscosity material to stick to the surfaces of the mold cavities, and better distribution of the plastic material in the blow mold.

It may be that elimination of the cosmetic defects is attributable to: a reduction in the temperature of the second portion of the parison, a resultant increase in the viscosity of the material, an increase in the pressure that is required to expand the second portion, and better distribution of the second portion inside the second container cavity because of the higher blowing pressure.

Thus, it may be that the higher viscosity of the material of the second portion of the parison as provided by the delay in blow molding, decreases the tendency of the plastic to stick to the surfaces of the blow mold, and also provides an increase in the blowing pressure that overcomes the tendency of the plastic to stick to the surfaces of the blow mold, thereby providing better distribution of the plastic material, and thereby eliminating the cosmetic defects.

However, without regard to the actual causes and effects, the present invention effectively eliminates the cosmetic defects that have attended "logged" blow molding by providing a process that includes: tandem molding of containers in a mouth-to-tail arrangement, and delaying the blow molding of a later-extruded portion of a parison with respect to blow molding an earlier-extruded portion of the parison into a container.

Stated another way, the present invention effectively eliminates the cosmetic defects that have attended "logged" blow molding by providing a process that includes: tandem molding of containers in a mouth-to-tail arrangement and cooling the later-extruded portion of the parison during the blow molding of an earlier-extruded portion of the parison, and/or cooling the later-extruded portion of the parison subsequent to blow molding the earlier-extruded portion.

SUMMARY OF THE INVENTION

In the present invention, two plastic containers are blow molded mouth-to-tail rather than being blow molded mouth-to-mouth as is done in "logged" blow molding.

Plastic tubing is extruded from an extrusion die and a parison is severed from the plastic tubing. The parison includes a first portion that is used to form a first container and a first moil and a second portion that is used to form a second container and a second moil.

The parison is enclosed in a blow mold with the first portion being enclosed in a first mold cavity that includes a first container cavity and a first moil cavity, with the second portion of the parison being enclosed in a second mold cavity that includes a second container cavity and a second moil cavity, and with the first and second portions of the parison being pneumatically isolated from each other by the parison being clamped together in the blow mold.

First and second blow needles are inserted through the first and second moil cavities of the blow mold and into the first and second portions of the parison.

Air is injected through the first blow needle and into the first portion of the parison blowing the first portion of the parison into a first container with a first moil attached thereto. After a predetermined time interval which is provided to allow the second portion of the parison to air cool, air is injected through the second blow needle and into the second portion of the parison blowing the second portion of the parison into a second container with a second moil attached thereto.

The finished containers are subsequently removed from the blow mold, are separated from their respective moils and given appropriate finishing operations.

According to one aspect of the invention there is provided a method for molding plastic containers which method comprises: extruding plastic tubing having a first portion and having a second portion that has been extruded subsequent to extruding the first portion; expanding the first portion into a first container; expanding the second portion into a second container, delaying the second expanding step with respect to the first expanding step; and separating the first container from the second container.

According to another aspect to the invention there is provided a method for molding plastic containers which method comprises: extruding plastic tubing having a first portion that is at a first average temperature, and having a second portion that has been extruded subsequent to extruding of the first portion and that has a second and higher average temperature; expanding the first portion into a first container; expanding the second portion into a second container; cooling the second portion from the higher temperature prior to the second expanding step; and separating the first container from the second container.

According to another aspect of the invention, there is provided a method for molding plastic containers, which method comprises: providing an elongated tubular parison that includes first and second portions; enclosing the parison in a mold having first and second mold cavities; expanding the first portion into the first mold cavity, thereby forming a first container; expanding the second portion into the second mold cavity, thereby forming a second container; and delaying the second expanding step with respect to the first expanding step.

According to another aspect of the invention, there is provided a method for molding plastic containers, which method comprises: providing a plastic tubing parison that includes first and second portions; providing a mold having first and second container cavities; enclosing the parison in the mold; pneumatically isolating the first portion of the parison from the second portion; inserting a first blow needle into the first portion and inserting a second blow needle into the second portion; communicating pressurized air to the first blow needle while isolating the pressurized air from the second blow needle, thereby forming a first container from the first portion; and communicating pressurized air to the second blow needle, thereby forming a second container from the second portion.

According to another aspect of the invention, there is provided apparatus for molding plastic containers, which apparatus comprises: extruding means, comprising an extrusion die, for extruding plastic tubing; molding means, for receiving a first portion of plastic tubing from the extrusion die, for forming a first container from the first portion, for receiving a second portion of plastic tubing from the extrusion die, and for forming a second container from the second portion that is integral to the first container subsequent to the forming of the first container; and separating means for separating the second container from the first container subsequent to forming both of the containers.

According to another aspect of the invention there is provided apparatus for molding plastic containers which apparatus comprises: molding means, comprising a mold having first and second container cavities, for receiving first and second portions of a parison into the mold, for pneumatically isolating the first portion from the second portion, and for forming first and second containers from the first and second portions, respectively; blow needle means, comprising first and second blow needles for communicating inside the first and second portions respectively, and means for supplying pressurized air to the first blow needle while isolating the second blow needle from the pressurized air and for subsequently supplying pressurized air to the second blow needle.

According to another aspect of the invention, there is provided apparatus for molding plastic containers, which apparatus comprises: extrusion means for extruding plastic tubing; severing means, for severing a parison from the plastic tubing that includes a first portion that is at a first average temperature and that includes a second portion that is at a second and higher average temperature; molding means, comprising a mold having first and second container cavities, for receiving the first and second portions into the mold for pneumatically isolating the first portion from the second portion and for forming first and second containers from the first and second portions, respectively; blow needle means, comprising first and second blow needles, for communicating inside the first and second portions, respectively; and means for supplying pressurized air to the first blow needle while isolating the second blow needle from the pressurized air, for cooling the second portion from the higher temperature, and for supplying pressurized air to the second blow needle subsequent to the cooling of the second portion from the higher temperature.

It is a primary object of the present invention to provide apparatus and method for blow molding more than one plastic container from a single parison.

It is another object of the present invention to increase molding time and decrease molding cost for blowing containers from extruded plastic tubing.

It is another object of the present invention to eliminate cosmetic defects from containers that are blow molded in tandem from a single extruded plastic parison.

BRIEF DESCRIPTION OF THE DRAWINGS

FIG. 2 is an end elevation of the molding machine of FIG. 1, taken substantially as shown by view line 2—2 of FIG. I, but with one rotary table and the mold halves thereof removed in order to show and describe the other rotary table and mold halves thereof;

FIG. 3 is a plan view of one half of a blow mold of the present invention, showing the two container cavities and the two moil cavities;

BEST MODE FOR CARRYING OUT THE INVENTION

Figure 1:
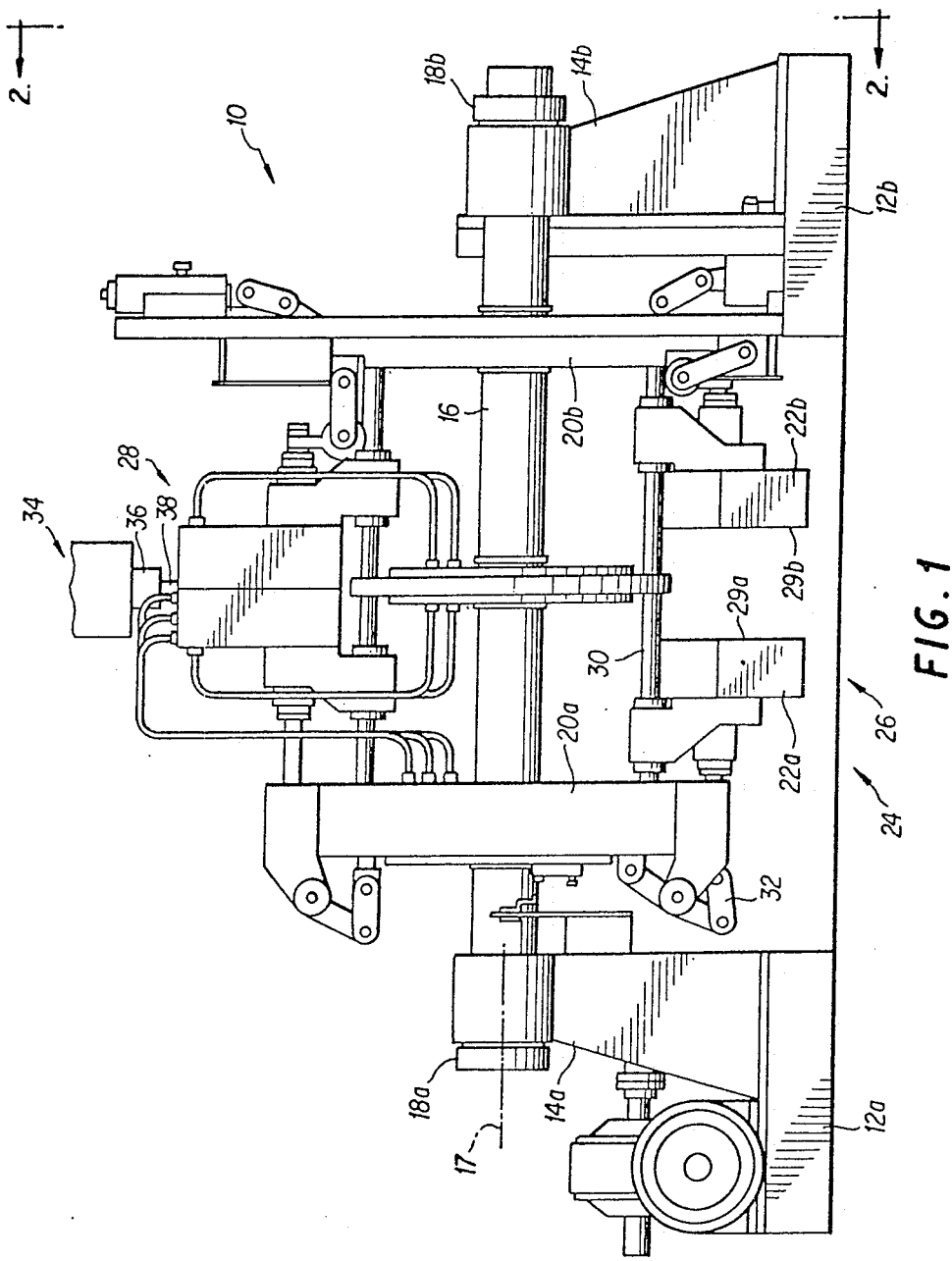
FIG. 1 is front elevation of a molding machine for use in performing the present invention.

Referring now to the drawings and more particularly to FIG. 1 and 2, a blow molding apparatus 10 includes base units 12a and 12b. bearing stands 14a and 14b, and a shaft 16 that is supported by the bearing stands 14a and 14b and bearings 18a and 18b. The shaft 16 rotates about an axis 17 and supports rotary tables 20a and 20b. A plurality of mold halves 22a are circumferentially disposed around the rotary table 20a and are attached thereto; and a plurality of mold halves 22b are circumferentially disposed around the rotary table 20b and are attached thereto.

The blow molding apparatus 10 includes a plurality of blow molds 24. Each of the blow molds 24 includes one of the mold halves 22a and one of the mold halves 22b. One of the blow molds 24 is shown in an open position 26, and another of the blow molds 24 is shown in a closed position 28.

The mold halves 22a and 22b are disposed circumferentially around the axis 17 of the shaft 16, and are attached to the rotary tables 20a and 20b. by a plurality of guide rods 30. An actuating means which includes a toggle mechanism 32, is attached to one of the rotary tables, 20a or 2ob, for each of the mold halves, 22a or 22b, to actuate respective ones of the blow molds 24 to the open position 26 and to the closed position 28. In the closed position 28, a face 29a of the mold half 22a abuts a face 29b of the mold half 22b.

The blow molding apparatus 10 includes an extrusion device 34 having an extrusion die 36 which extrudes plastic tubing 38. The plastic tubing 38 is cut off by a knife 40 to form parisons 41 each having a first portion, or earlier-extruded portion, 42, and each having a second portion, or later-extruded portion, 43, as shown in FIG. 5.

Figure 4:
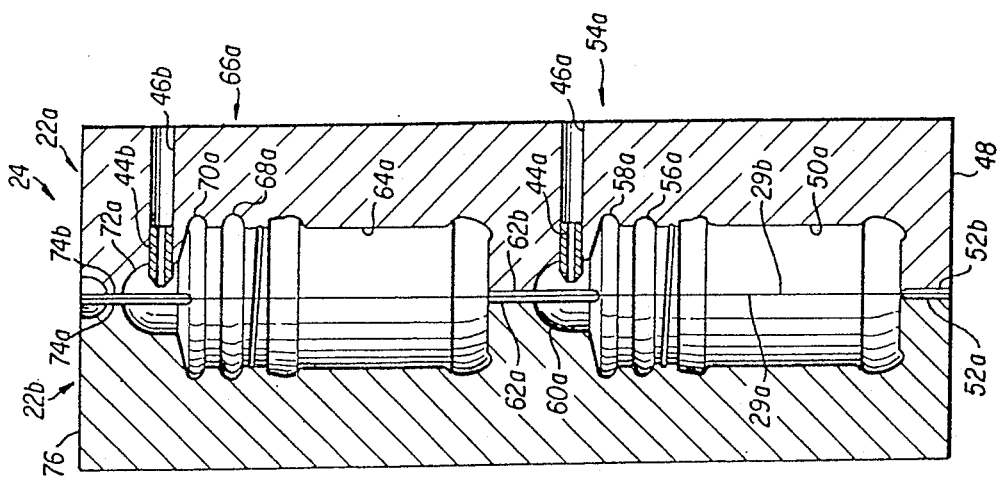
FIG. 4 is a cross-sectional view of the blow mold of the present invention, taken substantially as shown by section line 4—4 of FIG. 3.

Referring now to FIGS. 3 and 4, the mold halves 22a and 22b are mirror images of each other except for blow needles 44a and 44b which are inserted into respective ones of holes 46a and 46b. Having noted the only differences in the mold halves 22a and 22b, a description of one will suffice for both.

The mold half 22a includes a first end 48, a first container cavity 50a that is proximal to the end 48, a clamp-off cavity 52a that is interposed between the end 48 and the first container cavity 50a, a first moil cavity 54a that includes ring portions 56a and 58b, and a first dome portion 60a, a clamp-off cavity 62a that connects the first moil cavity 54a to a second container cavity 64a, a second moil cavity 66a that includes ring portions 68a and 70a, and that includes a second dome portion 72a, and a clamp-off cavity 74a that extends from the second moil cavity 66a to an end 76 of the mold half 22a.

Figure 5:
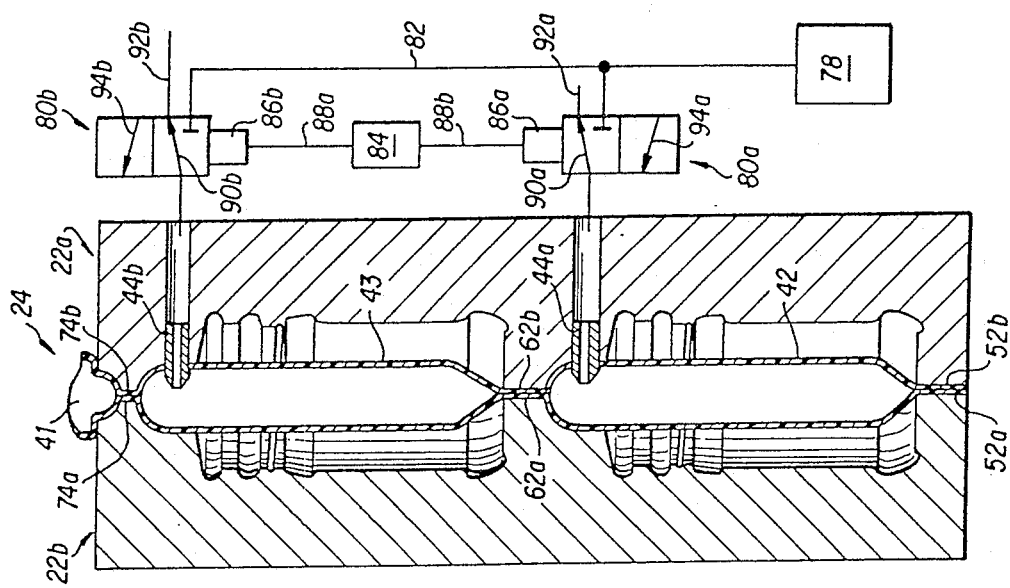
FIG. 5 is a cross-sectional view of the blow mold of FIG. 4, taken substantially the same as FIG. 4 but shown with a parison enclosed therein.

Referring now to FIG. 5, a parison 41 has been clamped between the mold halves 22a and 22b, flattering the parison 41 between clamp-off cavities 52a and 52b to seal the parison at the end 48, flattening the parison 41 between clamp-off cavities 74a and 74b to seal the parison at the end 76, and flattening the parison between clamp-off cavities 62a and 62b to isolate the earlier-extruded portion 12 from the later-extruded portion 43, and to isolate the blow needle 44a from the blow needle 44b.

A source of pressurized air 78 is connected to the blow needle 44a by a solenoid operated valve 80a and conduits 82; and the source 78 is connected to the blow needle 44b by a solenoid operated valve 80b. A programmable controller 84 is connected to solenoids 86a and 86b of the valves 80a and 80b by conductors 88a and 88b.

In the position shown for the solenoid operated valve 80a, air is exhausted from the blow needle 44a via a flow path 90a of the valve 80a, and via an open conduit 92a. In the other position of the solenoid operated valve 80a, air is supplied to the blow needle 44a via a flow Path 94a of the valve 80a. The flow paths 90b and 94b, and the open conduit 92b function with the valve 80b in like manner as described for the same named components of the valve 80a.

Thus, the programmable controller 84, together with the solenoid operated valves, 80a and 80b, are effective to selectively control supplying of pressurized air to the blow needles, 44a and 44b, and exhausting of air therefrom.

More specifically, the programmable controller 84 and the valves, 80a and 80b, communicate the source of pressurized air 78 to one of the blow needles, 44a or 44b, while isolating the other of the blow needles, 44a or 44b, from the source of pressurized air 78, and after a delay that is selectively determined by the programmable controller 84, can communicate the source of pressurized air 78 to the other blow needles, 44a or 44b.

Figure 6:
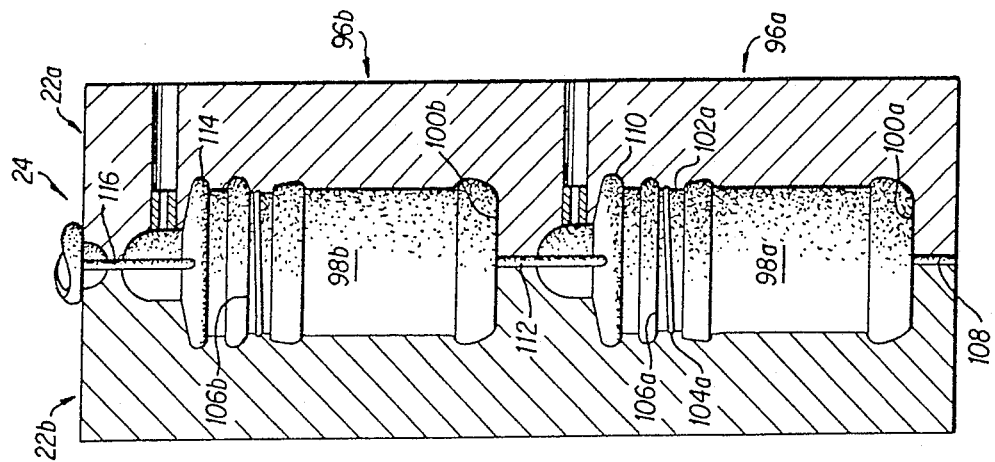
FIG. 6 is a cross-sectional view of the blow mold of FIGS. 4 and 5, taken substantially the same as FIGS. 4 and 5 but shown with two blown containers enclosed therein.

Referring now to FIG. 6, a first plastic container 96a in the blow mold 24 includes a body portion 98a, a bottom 100a, a threaded neck 102a with threads 104a, and a mouth 106a. The mold halves 22a and 22b include portions, not named or numbered, of the container cavities, 50a and 50b, which correspond to like portions of the plastic container 96a.

A first scrap tail or scrap portion 108 is attached to the bottom 100a of the first container 96a and must be removed. A first moil 110 is attached to the mouth 106a of the first container 96a and must be removed.

A second scrap tail or scrap portion 112 connects the first moil 110 to a bottom 100b of the second container 96b and must be removed from the second container 96b. A second moil 114 and a scrap nose, or scrap portion, 116 are attached to the mouth 106b of the second container 96b and must be removed.

The scrap portions, 108, 112, and 116, may be separated from the containers 96a and 96b, and the containers, 96a and 96b, may be separated from each other, by any suitable means, such as a trimming die. The particular apparatus and method for separating are not part of the present invention.

In like manner, the moils, 110 and 114, may be separated from their respective containers, 96a and 96b, by any suitable means, such as a hot knife. Again, the particular apparatus and method for separating are not a part of the present invention.

The method of the present invention includes: extruding plastic tubing 38, expanding an earlier-extruded portion 42 of the plastic tubing 38 into a first container 96a, expanding a later-extruded portion 43 of the plastic tubing 38 into a second container 96b, delaying the second expanding step, and separating the first container 96a from the second container 96b.

The method of the present invention may include: providing a parison 41 with an earlier-extruded portion 42 and a later-extruded portion 43 enclosing the parison 41 in a blow mold 24 having first and second container cavities, 64a and 64b, pneumatically isolating the first 42 and second 43 portions of the parison 41, inserting a first blow needle 44a into the first portion 42, inserting a second blow needle 44b into the second portion 43, communicating pressurized air to the first blow needle 44a while isolating the pressurized air from the second blow needle 44b, thereby forming a first container 96a from the first portion 42, and communicating pressurized air to the second blow needle 44b, hereby forming a second container 96b from the second portion 43.

The apparatus of the present invention includes molding means for receiving a first portion 42 of plastic tubing 38, for forming a first container 96a from the first portion 42, for receiving a second portion 43 of plastic tubing 38, for forming a second container 96b from the second portion 43 that is integral to the first container 96a subsequent to forming the first container 96a; and means for separating the first container 96a from the second container 96b subsequent to forming both, 96a and 96b, of the containers.

The apparatus of the present invention may include a mold 24 that has first and second container cavities, 50a and 50b, that receives first and second portions, 42 and 43, of a parison 41 into the mold 24, that pneumatically isolates the first portion 42 from the second portion 43, and that forms first and second containers, 96a and 96b, from the first and second portions, 42 and 43, respectively., blow needles, 44a and 44b, that communicate inside the first and second portions. 42 and 43 respectively; and valves, 80a and 80b, that cooperate to supply pressurized air to the blow needle 44a while isolating the blow needle 44b from the pressurized air and to subsequently supply pressurized air to the blow needle 44b.

While specific methods and apparatus have been disclosed in the Preceding description it should be understood that these specifics have been given for the purpose of disclosing the principles of the present invention and that many variations thereof will become apparent to those who are versed in the art. Therefore, the scope of the present invention is to be determined by the appended claims.

Industrial Applicability

The present invention is applicable to blow molding containers for use in any industry in which plastic containers are used, and more particularly for use in food-processing and distributing industries.

What is claimed is:

1. Apparatus for molding a pair of substantially identical plastic containers in tandem, which apparatus comprises:

molding means, comprising a mold having first and second substantially identical container cavities, for receiving said first and second portions of a parison into said mold, for pneumatically isolating said first portion from said second portion, and for forming first and second substantially identical containers from said first and second portions, respectively;

blow needle means, comprising first and second blow needles, for communicating inside said first and second portions, respectively; and means for supplying pressurized air to said first blow needle while isolating said second blow needle from said pressurized air, and for subsequently supplying pressurized air to said second blow needle.

2. An apparatus as claimed in claim 1 in which one of said blow needles is disposed between said container cavities.

3. An apparatus as claimed in claim 1 in which one of said container cavities is disposed between said blow needles.

4. Apparatus for molding a pair of substantially identical plastic containers in tandem, which apparatus comprises:

extrusion means for extruding plastic tubing;

severing means, for severing a parison from said plastic tubing that includes a first portion that is at a first average temperature and that includes a second portion that is at a second and higher average temperature;

molding means, comprising a mold having first and second substantially identical container cavities, for receiving said first and second portions into said mold, for pneumatically isolating said first portion from said second portion, and for forming first and second substantially identical containers from said first and second portions, respectively;

blow needle means, comprising first and second blow needles, for communicating inside said first and second portions, respectively; and means for supplying pressurized air to said first blow needle while isolating said second blow needle from said pressurized air, for cooling said second portion from said higher temperature, and for supplying pressurized air to said second blow needle subsequent to said cooling of said second portion from said higher temperature.

5. An apparatus as claimed in claim 4 in which said means for cooling comprises means for delaying said supplying of pressurized air to said second blow needle.

* * * * *